June 4, 1946.  T. L. YATES  2,401,449
RESILIENT MOUNTING
Filed Oct. 29, 1942  3 Sheets-Sheet 2

Tom L. Yates
Inventor

By
Attorney

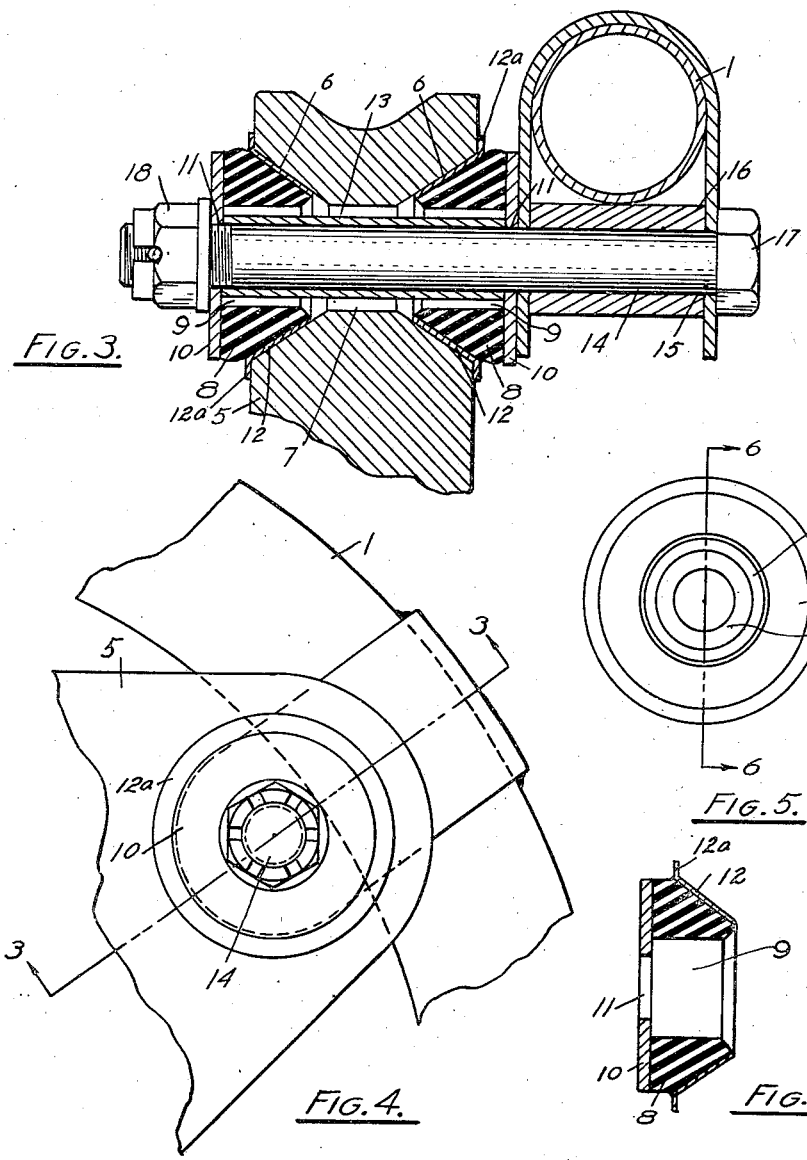

Patented June 4, 1946

2,401,449

UNITED STATES PATENT OFFICE 2,401,449

RESILIENT MOUNTING

Tom L. Yates, Erie, Pa., assignor to Lord Manufacturing Company, Erie, Pa., a corporation of Pennsylvania Application October 29, 1942, Serial No. 463,737

11 Claims. (Cl. 248—5)

This invention relates to resilient mountings and is of particular advantage by reason of its simplicity and also because of its adaptability for adjustment to provide different characteristics that may be desired.

Features and details of the invention will appear from the specification and claims.

Figure 1:
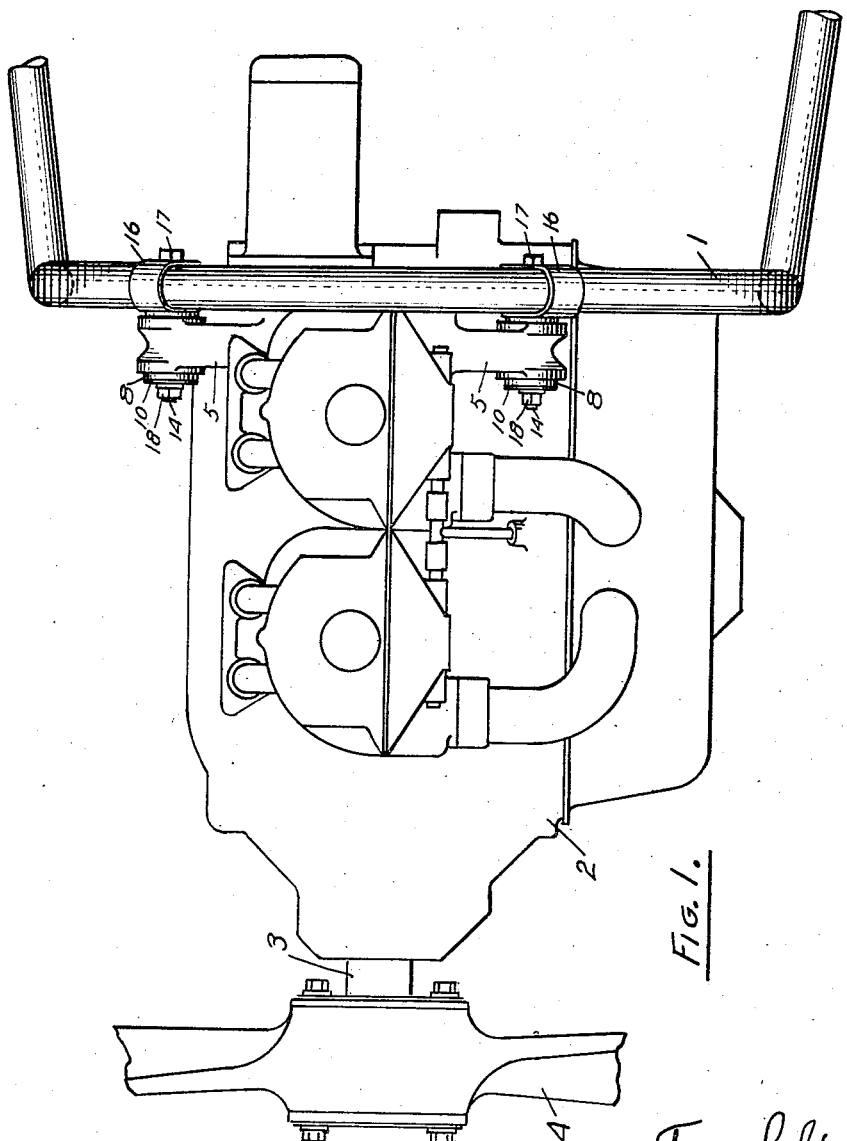

A preferred embodiment of the invention is illustrated in the accompanying drawings as follows:

Fig. 1 shows a side elevation of an airplane engine carried by a support by means of mountings of the invention.

Figure 2:
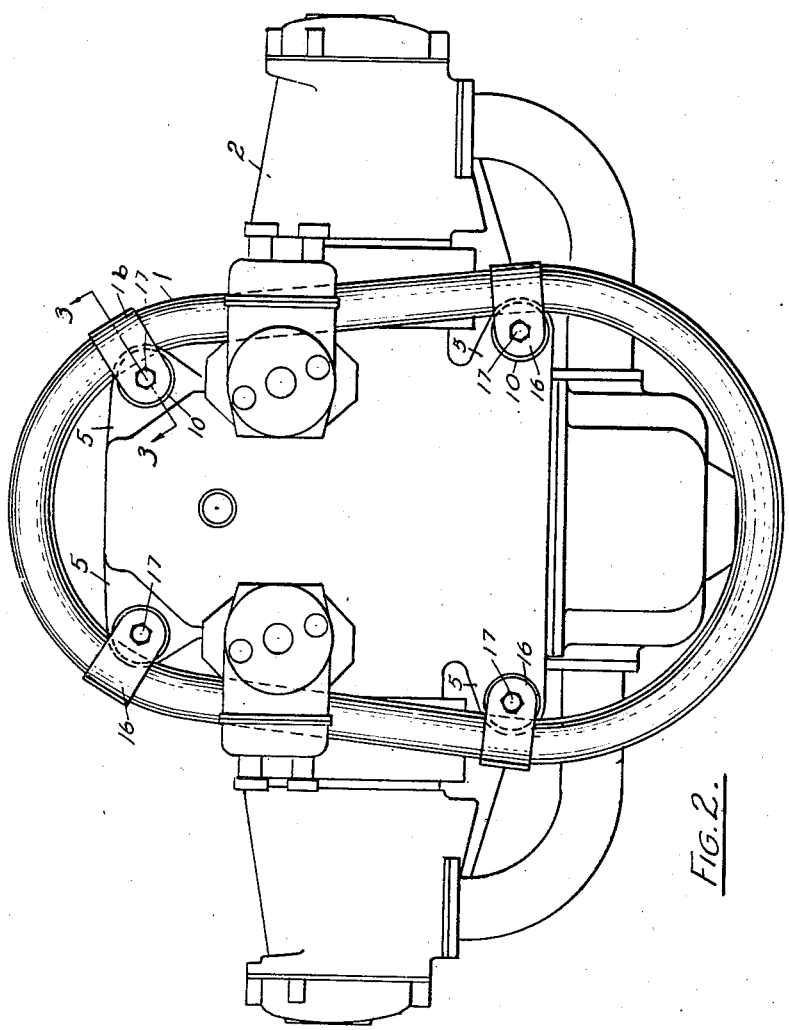

Fig. 2 a rear view of the engine.

Fig. 3 an enlarged central section through a mounting on the line 3—3 in Fig. 4.

Fig. 4 an enlarged view of a portion of the engine support with the mounting in place.

Fig. 5 an end view of the resilient element of the mounting.

Fig. 6 a section on the line 6—6 in Fig. 5.

1 marks a support, being a part of the usual portion of the airplane fuselage for this purpose, 2 an overhanging engine, that shown having opposed radial cylinders, 3 a driving shaft, 4 a propeller. These parts may be of any common construction.

The mounting proper comprises a receiving member 5 which may be one of the lugs on the engine. This receiving member has opposingly faced tapered sockets 6 and an opening 7 connecting these sockets. Resilient elements 8 are arranged in the sockets. These have openings 9 and the resilient member is bonded to a pressure plate 10. The pressure plate has an opening 11 and preferably the conical surfaces of the elements 8 are provided with metal coverings 12 bonded to this conical surface. The metal covering has a flange extension 12a which is adapted to engage the ends of the receiving member.

A spacing member 13 is arranged between the opposing pressure plates, and a bolt 14 extends through this spaced member, the openings 11 and through an opening 15 in a bracket 16 secured to the supporting ring 1. The bolt has a head 17 and a nut 18 at the opposite end.

The opening 9 through the resilient element is slightly larger than the spacing sleeve 13 and the opening 7 also slightly larger than the spacing element so that the bolt may move laterally with relation to the resilient members. Such movement, however, moves the pressure plates 10 laterally by reason of the fact that the opening 11 corresponds to the size of the bolt. This movement of the pressure plate stresses the rubber between the pressure plate and the end of the receiving member in shear.

As placed on the engine, the torque actions are accommodated largely through the shear action of the rubber. The load stresses are received largely through the rubber under direct stress modified by the shear action of the inner surface of the rubber incident to the inclination of the conical surfaces and the inward extension of the rubber from the inner edge of the wall of the socket. This inwardly extending portion of the rubber is entirely free to respond in shear. In design the thickness of this overhanging portion may be made to change the characteristics in the axial direction. The relative resistance may also be varied by preloading the rubber through the adjustment of the bolt and changing the length of the spacer sleeve as desired. That is to say, the rubber may be more or less compressed without to a very great extent changing the shear resistance of the mountings. Thus the characteristics of the mounting may be very easily controlled merely by substitution of these distance spacers.

What I claim as new is:

1. A resilient mounting comprising a receiving member having a conical socket, an element of resilient material such as rubber seated in the socket and fixed relative to the conical surface of the socket, said element having an axial opening therethrough and extending axially outwardly from the socket, a pressure member secured to the outer end of the element, and a bolt extending from the pressure member through and spaced from the opening in the element and yieldably anchored with relation to the receiving member, said bolt being free to move laterally with relation to the receiving member and element, the portion of the element in the space between the members and the inward extension of the element permitting a relative lateral movement of the members through yielding of the element in shear to accommodate such movement.

2. A resilient mounting comprising a receiving member having a conical socket, an element of resilient material such as rubber in the socket, said element having an axial opening therethrough and extending axially outwardly from the socket, a conical bearing plate secured to the element and arranged between the element and the conical socket, a pressure member secured to the outer end of the element, a bolt extending from the pressure member through and spaced from the opening in the element, means anchoring the bolt with relation to the receiving member to permit lateral movement of the bolt with relation to the receiving member and element, the portion of the element in the space between the members and the inward extension of the element permitting a relative lateral movement of the members through yielding of the element in shear to accommodate such movement.

3. In a mounting, the combination of a support, an overhanging engine carried by the support, and a series of resilient mounting units between the support and the engine, each unit comprising a receiving member having a socket, an element of resilient material such as rubber seated and secured in the socket, said element having an axial opening therethrough and extending axially outwardly from the socket and radially inwardly from the wall of the socket, a pressure member secured to the outer end of the element, a bolt extending axially from the pressure member through and spaced from the opening in the element and anchored with relation to the receiving member, said bolt being free to move laterally with relation to the receiving member and element, the portion of the element in the space between the members and the inward extension of the element permitting a relative lateral movement of the members through yielding of the element in shear to accommodate such movement and axially at least partially in shear, the bolts extending in the direction of the axis of the engine.

4. In a mounting, the combination of a support, an overhanging engine carried by the support, and a series of resilient mounting units between the support and the engine, each unit comprising a receiving member having a conical socket, an element of resilient material such as rubber seated in the socket and fixed relative to the conical surface of the socket, said element having an axial opening therethrough and extending axially outwardly from the socket and radially inwardly from the wall of the socket, a pressure member secured to the outer end of the element, a bolt extending axially from the pressure member through and spaced from the opening in the element and anchored with relation to the receiving member, said bolt being free to move laterally with relation to the receiving member and element, the portion of the element in the space between the members and the inward extension of the element permitting a relative lateral movement of the members through yielding of the element in shear to accommodate such movement and axially at least partially in shear, the bolts extending in the direction of the axis of the engine.

5. A resilient mounting comprising a receiving member having a socket, an element of resilient material such as rubber having its inner end conforming and fixed with the side walls of the socket and its outer end projecting axially outward from the socket, a pressure member secured to the outer end of the element, a bolt extending axially from the pressure member through the element, a clearance opening around the bolt in said element and said receiving member providing space for shear distortion of the resilient material when subjected to vibrations laterally of the bolt, means constraining the bolt to move laterally with the pressure member, and means yieldably anchoring the bolt to the receiving member to permit lateral movement of the bolt in said clearance opening with relation to the receiving member and said element, the portion of the element in the space between the members and the inward extension of the element permitting relative lateral movement of the members through yielding of the element in shear to accommodate such movement and the element permitting relative axial movement of the members at least partially in shear.

6. A resilient mounting comprising a receiving member having a socket, an element of resilient material such as rubber having its inner end conforming and fixed with the side walls of the socket and its outer end projecting axially outward from the socket, a pressure member secured to the outer end of the element, a bolt extending axially from the pressure member through the element for compressing the element between said members, a spacer on the bolt for limiting the compression of the element whereby the axial stiffness of the element is determined by the spacer, a clearance opening around the bolt in said element and said receiving member providing space for shear distortion of the resilient material when subjected to vibrations laterally of the bolt, means constraining the bolt to move laterally with the pressure member, and means yieldably anchoring the bolt to the receiving member to permit lateral movement of the bolt in said clearance opening with relation to the receiving member and said element, the portion of the element in the space between the members and the inward extension of the element permitting relative lateral movement of the members through yielding of the element in shear to accommodate such movement and the element permitting relative axial movement of the members at least partially in shear.

7. A mounting comprising two members, one having a laterally extending surface and the other a conical surface, the lateral surface being spaced axially beyond the end of the conical surface, an element of resilient material engaging the surfaces and bridging the space between the members, said element having an axial opening, the portion of the element beyond the conical surface responding in shear to relative lateral movement between the members, a bolt extending between said members and through and spaced from the opening for compressing the element axially to determine the resistance to relative axial movement of the members without materially changing the lateral shear resistances, and a yieldable connection between the bolt and one of said members permitting lateral movement of the bolt in said opening.

8. A resilient flexible engine mount comprising rings of resilient material such as rubber spaced apart along an axis, each ring having axially spaced faces transverse to the axis, a mounting lug between the rings and fixed to adjacent faces of the rings, a bolt extending through the rings and an opening in the lug and adapted to be attached to another mounting lug, washers on the bolt fixed to the other faces of the rings, and sleeve-like spacer means on the bolt holding the washers in spaced relation, the inside diameters of the rings and the opening in the first mounting lug being sufficiently in excess of the outside diameter of the bolt and spacer assembly to provide space for shear distortion of said rings when subject to vibrations transverse to the bolt.

9. A resilient flexible engine mount adapted to be interposed between a part on the engine and a part on the frame on which the engine is to be mounted, said mount including an assembly bolt adapted to be fixed to one of the parts, a pair of washers on said bolt, sleeve-like spacer means upon said bolt holding said washers in spaced relation, resilient means comprising a pair of cushioning rings each having spaced faces transverse to the bolt and having one face of each thereof secured to the inner opposed faces of said washers and having an inner diameter sufficiently in excess of the overall diameter of said spacer and assembly bolt as will provide space for distortion of the rings shearwise transverse to the bolt, a load carrying member adapted to be fixed to the other of said parts, said member having a portion surrounding the spacer between the rings and secured to the other faces of said cushioning rings in axially spaced relation to said washers and in radially spaced relation to said spacer and assembly bolt, and said resilient means having portions extending between said spacer and member adapted to serve as a cushioning bumper in the event of extreme shearwise distortion of said cushioning rings in response to engine vibration.

10. Resilient means for connecting a part on an engine and a part on an engine support comprising a socket adapted to be secured to one of said parts, a bolt having a portion extending therethrough, said bolt being adapted to be secured to the other of said parts, and spaced resilient units disposed at opposite ends of said socket and connecting said bolt portion and socket, each of said units including an end plate rigidly engaged with an end of the socket, a second end plate carried by the said bolt portion and axially spaced from the first end plate, and a pad of resilient material disposed between and bonded to said end plates and loosely surrounding the bolt to provide space for shear distortion by vibrations transverse to the bolt.

11. A shear sandwich mounting comprising two members spaced apart having opposed surfaces, one of which is a conical surface inclined toward the other surface, the other surface being spaced axially beyond the end of the conical surface, and an annular element of resilient material such as rubber bonded to the surfaces and bridging the space between the members, said element responding in shear to relative movement in the direction transverse to the axis of the conical surface.

TOM L. YATES.